US007909691B1

(12) United States Patent
Skatter

(10) Patent No.: US 7,909,691 B1
(45) Date of Patent: Mar. 22, 2011

(54) METHOD AND SYSTEM FOR SELECTING WINNING NUMBERS IN A LOTTERY GAME

(75) Inventor: Sondre Skatter, Oakland, CA (US)

(73) Assignee: Sondre Skatter, Oakland, CA (US)

( * ) Notice: Subject to any disclaimer, the term of this patent is extended or adjusted under 35 U.S.C. 154(b) by 1293 days.

(21) Appl. No.: 11/148,609

(22) Filed: Jun. 9, 2005

Related U.S. Application Data

(60) Provisional application No. 60/641,813, filed on Jan. 3, 2005.

(51) Int. Cl.
*G06F 19/00* (2006.01)

(52) U.S. Cl. .................. 463/21; 463/1; 463/16; 463/17; 463/18; 463/22; 463/40; 463/41; 463/42

(58) Field of Classification Search .................... 463/17, 463/22
See application file for complete search history.

(56) References Cited

U.S. PATENT DOCUMENTS 4,494,197 A * 1/1985 Troy et al. ....................... 463/18
4,593,904 A * 6/1986 Graves .............................. 463/9
5,893,797 A * 4/1999 Marino et al. .................. 463/46
6,080,062 A * 6/2000 Olson ............................. 463/42
6,783,456 B2 * 8/2004 White ............................. 463/18
2003/0027621 A1 * 2/2003 Libby et al. ..................... 463/17
2004/0054593 A1 * 3/2004 Van Luchen .................... 705/16

* cited by examiner

*Primary Examiner* — Ronald Laneau
*Assistant Examiner* — Justin Myhr

(57) ABSTRACT

Use of the present invention provides a method and system for generating the winning combination of numbers in a lottery game. The method determines a winning number combination from among a plurality of number combination entries submitted by a plurality of players, each of which could submit their entries from a plurality of locations. A unique algorithm assigns significance to the position of the numbers in each number combination entry by presenting the players with a template comprised of a plurality of sections. After all number combination entries have been received, the winning numbers are generated by a hybrid process. In at least one of the sections, the winning selection is the selection in that section that received the least bets among all the possible selections in the current game cycle. The winning numbers for the remaining sections are generated by a traditional random drawing. Concatenating the winning selections in all sections thus forms the winning number combination.

18 Claims, 9 Drawing Sheets

METHOD AND SYSTEM FOR SELECTING WINNING NUMBERS IN A LOTTERY GAME

This non provisional patent application claims priority based upon provisional application No. 60/641,813 filed Jan. 3, 2005.

BRIEF DESCRIPTION

A method for generating the winning number combination in a lottery game. The method comprises partially replacing the random number drawing process with a non-random, positionally dependent number selection scheme which depends on the current entries provided by a plurality of players at a plurality of locations. A subset of the winning numbers that comprises the winning number combination is generated by a standard random drawing process. The remaining number entries in the winning number combination are the selections that were chosen least frequently by the players in the current game cycle. In other words, one part of the winning number combination will be the selection least chosen among the players whereas another part will be subject to random drawing. Also described by the present invention is a system for implementing the inventive method.

BACKGROUND OF THE INVENTION

Lottery games, or Lotto as it is sometimes called, have gained great popularity in both the United States and abroad. Today, legal lotto games are conducted in most US states and Canadian provinces as well as internationally in many countries. Lotto is a major source of revenues for the states and provinces which sponsor lotteries.

Lotto is a gambling game in which the player must correctly pick a pre-set quantity of numbers to be drawn from a larger pool of numbers. In a typical lotto game, a player fills out a computer coded card(s) with selected number combinations. The card(s) are then presented to an authorized lottery dealer. The dealer issues lotto tickets containing the one or more selected sets that have been generated by a computerized ticket generator and purchased by the player.

Current jackpot games typically include matching six or seven numbers selected from a set of 40 or 50 or more against numbers drawn in a weekly or biweekly drawing. Other Lotto games, for example the so called PICK 3 or PICK 4 games, involve a selection of three and four numbers respectively from a group of (usually) 10 numbers, and matching the selected numbers against daily drawings held by the lottery sponsor.

At the time of the jackpot drawing, which is televised in many jurisdictions, the numbers (usually printed on balls) are withdrawn from the total number pool using number selection devices such as air flotation or drum roll. The balls are drawn without replacement, that is, after a particular number is drawn it is not returned to the pool and cannot be redrawn. A preset number of balls forms a winning number combination. If the numbers selected by the player on a particular ticket correspond to the winning number combination, the player wins a cash prize. Currently existing lotto games pay cash awards in instances where a player picks all of the drawn numbers corresponding to a winning number combination, as well as those instances in which a player has picked less than all of the numbers, for example when the player has correctly picked four out of six or five out of six numbers of the winning number combination.

Lotto tickets are typically purchased in two ways. Initially, players can code up a computer readable card with their number selections. Alternatively, lottery tickets are purchased by players who permit random ticket generators to generate their tickets. The selected number combinations are then transmitted to a central computerized system which stores the selected number combinations, whether coded up by a player or randomly selected by machine. Each of the transmitted number combinations corresponds to a purchased ticket. Alternatively, the wage is placed via a web server on the internet. At the time of the drawing, the central governing authority, which is typically a state contractor, can thereby quickly determine whether one or more jackpot prizes has been awarded, and can further determine the number and distribution of sub jackpot prizes.

Since the winning numbers are picked in a random process the game of lotto is entirely a game of luck. Nevertheless, players often apply superstition or attempts to use statistics from previous drawings to improve their odds. Although mathematically this may not make sense, this behavior appeals to humans' tendency and drive to develop models and theories to succeed. It would therefore be desirable to provide a novel lotto style game which would increase player interest by encouraging prediction of the outcome and thus help to increase the revenues of a lottery which adopted the game.

The present invention adds a dimension to a lotto type game where it actually becomes meaningful to attempt to predict the winning numbers. Some of the winning numbers, instead of resulting from a random selection process, are the selections that received the fewest bets, thus the players themselves influence the winning number combination. The individual player who can predict the bets of the majority of the players—and thence choose the opposite number selection strategy—will increase his/her odds of being the winner.

In traditional lotto, the player selects a set of numbers out of a given number population, e.g. picks 7 numbers between 1 and 34. This game is a so-called without-replacement type of drawing. The player simply picks a series of balls/numbers out of a single basket, wherein the balls/numbers are not put back into the basket after drawn, and so each number can only occur once. In the present invention the balls are instead picked with replacement, or more aptly, from different baskets. If each number is picked from a different basket, then each number can also be in a different range. For example, number one could be a number between 1 and 10, and number 2 could be a number between 1 and 34. Pick 3 is an example of with-replacement game, but in this case the balls are still picked from a single basket, i.e. from the same number range, only with the number replaced in between. In such games the order of the numbers are important, and this is what is meant by positionally significant. Having multiple baskets may appear to add complexity to the game, and in order to mitigate this effect, one can utilize numbering systems with inherent meaning. For example, each basket can represent a part of a date/time combination such as minute, hour, or day of month, and put together the numbers represent a date and a time.

Current lotto numbering systems, as described above, are not very interesting to the player. This is because whether a player chooses to code up a card or allow a machine to make the selection, there is little or no meaning attached to the number. A further dimension of interest can thus be added by making the number selection inherently meaningful by mapping it to something real such as a date/time combination or a geographical coordinate system. Doing this makes the player/game interface more enticing.

Adding these new dimensions—the least chosen selection aspect and numbers with inherent meaning—could attract interest to the game and improve the revenues for the sponsors. The authorized lotto dealer could publish the winning number combinations from previous games providing useful input for players when picking the numbers for the next game. Online user groups, or web communities can also post theories and discussions, further fueling interest and generating sophisticated game strategies. Even for players who take no interest in predicting the outcome or using some predetermined strategy, the game still retains all the qualities of a conventional lotto game. Not knowing anything about previous games or other players' strategies means that the winning numbers essentially are random. Thus, the player that picks random numbers has exactly the same odds as before to win. Potentially, the prizes may be bigger since the winning numbers are always the least played numbers.

SUMMARY OF THE INVENTION

Use of the present invention provides a method and system for generating the winning combination of numbers in a lottery game, and thus presents an alternative to the pure random draw process to determine the winning numbers in a lotto game. The method selects a winning number combination from among a plurality of number combination entries submitted by a plurality of players, each of which could submit their entries from a plurality of locations. A unique algorithm assigns significance to the position of the numbers in each number combination entry by presenting the players with a template comprised of a plurality of sections. Each section has a set of possible selections. For example a section can be populated by numbers between 1 and 34 where the user has to pick one of these selections. Without departing from the definition of a section as containing a set of possible selection, it could also contain a multidimensional set of selections. For example a selection may be combination of a color and a number. Or it can be the combination of month, day and year. In these cases there are still a finite number of distinct selections from which the player must pick one selection.

For at least one of the sections the winning number is the selection that was the least chosen by the plurality of players in the current game cycle. In the remaining sections the winning numbers are determined by a traditional random drawing, either by a random number generator in a computer or by an offline physical drawing process such as drawing balls from a basket. After all number combination entries have been received, the winning selection from each of the plurality of sections is determined, either based on the random draw or the least-chosen-selection rule, then concatenated to form the winning number combination.

The system of the present invention is comprised of a plurality of remote locations, a network, and a central processor. Each of the plurality of remote locations is capable of communicating with the central processor via the network. Players complete their templates at any of the plurality of remote locations, submitting their entries to the central processor via the network. After the closing time for the current lottery game occurs, the central processor then analyzes each of the submitted number combination entries. The winning number combination is then formed by the hybrid process of taking the least chosen selection by all players in the present game for the subset of the sections subjected to this winning number generation method, and a random drawing for the remaining sections. The random drawing can be a computerized process or based on a traditional drawing of balls from a basket. Once the winning number combination is formed, the result is communicated to the plurality of remote locations via the network and is also stored to memory to form a historical record for use by players in future games.

In one embodiment the plurality of remote locations are authorized lotto game agents such as convenience stores, the network is the Internet and the central processor is a computer located at the lotto game provider's site. In this same embodiment the template provided to the players is comprised of a calendar model, wherein Year, Month and Day combinations make up the selections in a first section, which is subjected to the Least Chosen Selection winning number generation method, and Hour and Seconds make up the remaining sections, either in the same section or in separate sections, and are subjected to the random winning number generation method. Thus, the winning number is in fact the date that was least selected in present game combined with a time that was determined by a random drawing.

Because the unique algorithm selects the least common selection for at least one of the sections the method of the present inventions differs from other lotto game methods. And because the method of the present invention keeps and publishes a history of winning number combinations, the players are able to apply some alternate selection criteria in future games. Further, because the template is presented to players in an easy to understand format, playing the game is simple and understandable.

Amongst the various ways that a least chosen selection algorithm might be applied to a lottery game, the present invention using a combination of least chosen selection and random selection satisfies two critical requirements for a lotto game to be viable.

First, a lotto game must not be vulnerable to any type of game rigging. In some manifestations of least-selected numbers game there are strategies where big players, or a syndicate of players, can place a large number of bets to affect the outcome of the game, i.e. the winning numbers. Then the same player can place one or several bets on the numbers that have been rigged to win. If the expected prize payout is larger than the cost of rigging the game, the game concept is not viable. By keeping some sections subject to random drawing, the ability to rig the game is severely impaired. Keeping only one section subject to the least-chosen-selection method is another safeguard.

Second, it is important that lotto games have occasional large payouts—often called jackpots. This means that the winning odds must be calibrated to the player population, in such a way that there is only a handful—if any—jackpot winners in every game. If there was only one section, with a large number of possible selections, subjected to the least chosen selection method, there would likely be many selections that received no bets at all, then there would be several selections that have been picked only once. Thus there would be several winning combinations and many winners. By only letting one section be subject to the least selected number principle one can make sure that every combination receives on average hundreds, thousands, or tens of thousands of bets, in which case there most often will be only one winning combination. This winning combination will be shared by many players, but to get the top prize the player also needs to have the random number sections correct. Thus the novelty of the present invention lies in finding a way to apply the least chosen selection principle in a way that 1) is not riggable and 2) provides large jackpots with few winners.

It is an object of the present invention to partially substitute the random number drawing process of any lotto type game with a novel number selection process as described above. It is a further object of the present invention to create a number combination selection scheme having positional significance. It is still a further object of the present invention to provide a novel lotto type game which can be easily implemented with existing on-line lotto systems. These and other objects and advantages of the present invention will become apparent from the detailed description which follows in conjunction with the drawings.

DETAILED DESCRIPTION OF PREFERRED EMBODIMENTS

As described briefly above, the method and system of the present invention provide a unique and novel way for a lotto operator to generate the winning number combination. As will be discussed below, the method of the present invention further provides an increased level of interest among the players by giving them an alternative historical tool with which to make their selections.

Figure 1:
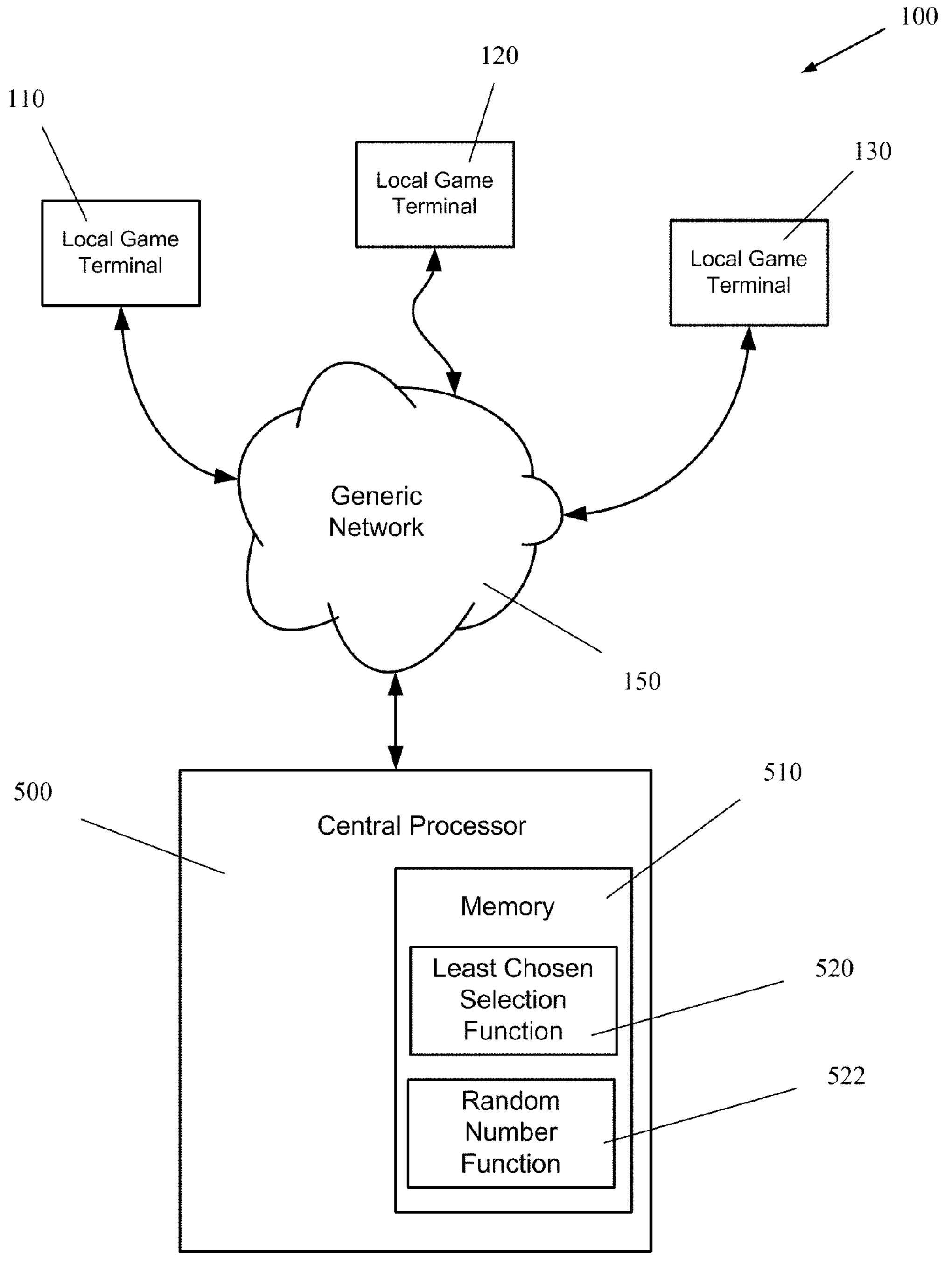
FIG. 1: is a high level diagram of a system that can implement the method of the present invention.

FIG. 1 shows a high level system 100 capable of implementing the method of the present invention. Local Game Terminals 110, 120 and 130 in one preferred embodiment of the present invention are remote authorized lotto agents, for example, convenience stores. It will be recognized, however, that these remote locations could be any site that has the ability to communicate with the Generic Network 150. Players who wish to enter a number combination in the current game may do so at any of these remote locations.

Also in this preferred embodiment, the Generic Network 150 is the Internet. It will be understood that any network capable of communicating between the remote locations such as Local Game Terminals 110, 120 and 130 and the Central Processor 500 could be used without departing from the spirit of the invention, thus the use of the Internet should not be read as a limitation on the scope of the invention. By way of example, but not meant as a limitation, the Generic Network 150 could be the Public Switched Telephone Network [PSTN]. Alternatively, the network could be wireless, such as a satellite network or a microwave network.

The Central Processor 500 in this preferred embodiment is a computer containing, among other things, a Memory 510 with at least a Least Chosen Selection Function 520 (LCSF). It will be recognized that the Central Processor 500 is comprised of a number of other hardware and software components, but since these do not relate directly to the method of the present invention they are not shown or discussed for clarity. It will be further recognized that any central processing machine with the capability of storing instructions and operating upon data could be used without departing from the spirit of the invention, thus no limitation on the scope of the invention is implied.

Before a detailed discussion of the method of the present invention is presented, a short discussion of a typical game cycle would be instructive. At the start of a game cycle a population of players select their entries, for example six numbers selected from a group of fifty numbers, and submit their entries to a central control point by some method. This method can be one of many, but common to all games is that at some point in time no further entries are accepted and the game is closed. Once closed all entries are recorded by one of several means and a winning number combination is determined and published. As discussed above, the selection method can be one of many, but is always random. Once the winning number combination is published the winning players may claim their prizes by presenting proof that they did indeed have the winning number combination. Thus the five main steps in the game process are number selection, entry submission, winning number generation, publication and prize collection.

The method of the present invention operates along the same general lines. The fundamental difference between the method of the present invention and contemporary lotto gaming methods lies in the winning number generation step. Advantageously, the method of the present invention also increases player interest while providing a unique method of number selection and winning number generation. FIG. 2 presents a detailed flow chart of the method of the present invention. It will be understood that since the difference between the present invention and contemporary lotto gaming methods lies in the selection and winning number generation steps, only those steps will be discussed in detail. Other steps common to all lotto gaming methods, while mentioned, are not discussed in detail since they are not germane to the method of the invention.

Figure 2A:
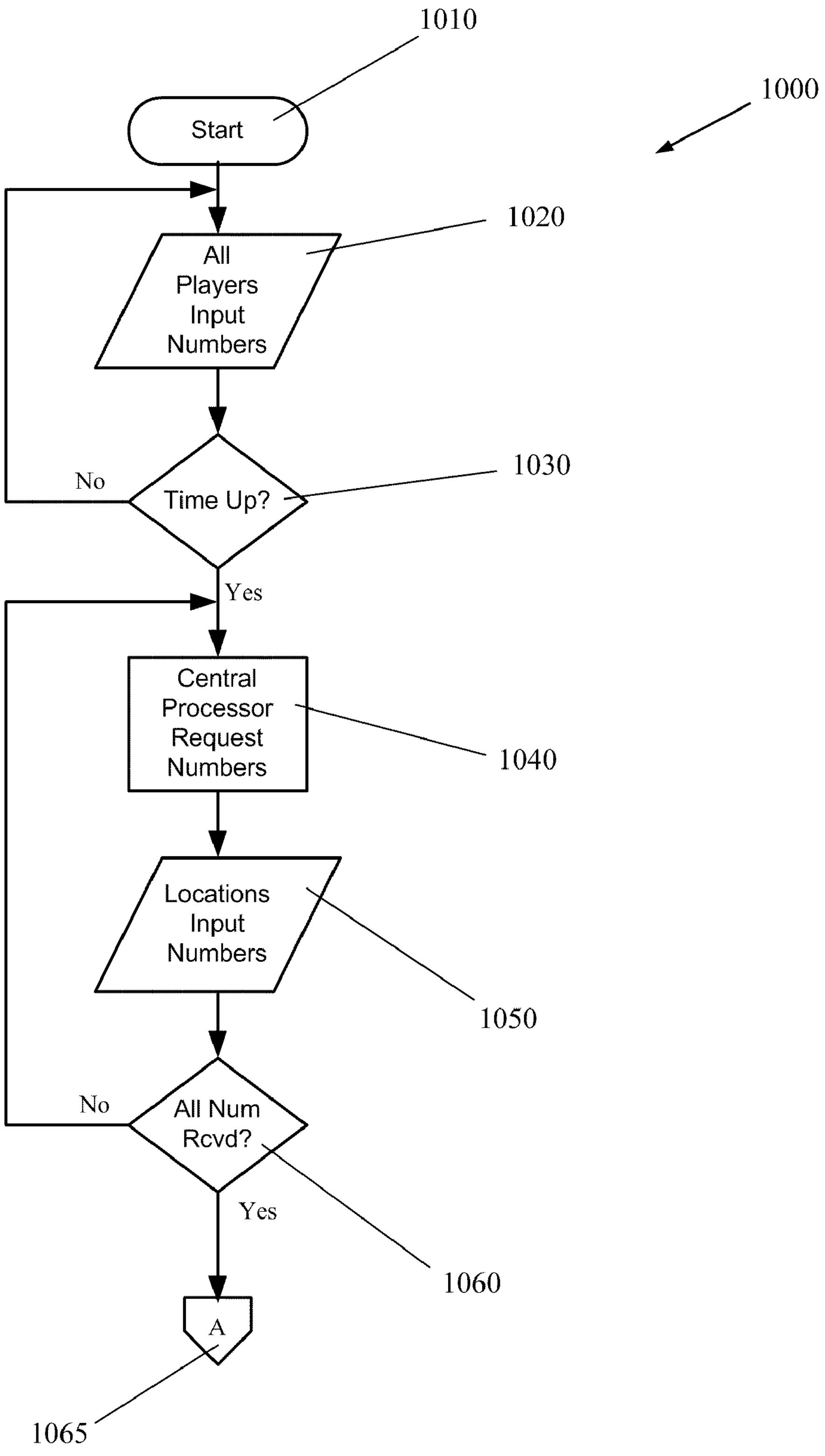
FIGS. 2A-2D: is a flow chart of the method of the present invention with particular attention given to the least chosen selection algorithm.

Starting with FIG. 2A, a flow chart 1000 of the method of the present invention indicates that the process begins at the Start step 1010. At All Players Input Numbers step 1020 the population of players selects their numbers and submits them as number combination entries. As will be discussed in detail below, one novel aspect of the method of the present invention is the use of positional significance for individual numbers selected by a player. For example there may be six numbers to be correctly selected in order to claim the winning number prize.

To increase player interest and to make the number selection process as easy as possible, number types may be used. For example, as discussed in detail below in conjunction with FIG. 4, in a preferred embodiment the number type is Time and the sections of the template are formed by Year, Month, Week, Day, Hour and Minute. It will be obvious that other number types could be used without departing from the spirit of the invention. By way of example, but not meant as a limitation, the number type could be numbers between one and fifty and a section could be populated by any number from one to fifty. It will be further obvious that other data types are possible while still conforming to the spirit of the invention. For example, the data types could be colors or text characters and still be analyzed using the least chosen selection method of the present invention.

Returning to FIG. 2A, process flow enters the Time Up decision 1030. If the time for the game to close has not arrived, the process follows the No path and loops back to the All Players Input Numbers step 1020 allowing more players to select their number combination entries. However, if the time for the game to close has arrived, the Yes path is followed out of the Time Up decision 1030 and flow passes to the Central Processor Request Numbers step 1040. For the process of the preferred embodiment it is assumed that the remote locations at which the players make their number combination selections batch up the entries, then send the entries to the central processor upon request. It will be understood that this is not the only possible method of consolidating players' entries, but since the exact consolidation method does not impinge on the method of the present invention it is not discussed in detail for clarity.

Once the central processor has sent a request to the remote locations, the batched up number combination entries are sent to the central processor at the Locations Input Numbers step 1050. As the number combination entries are received by the central processor a data base is constructed such that each number entry combination forms a single data base record. As will be described in detail below, these records are acted upon by the method of the present invention in a manner that determines for at least one of the sections which number selection of the possible selections a player could pick have actually been picked the least.

Process flow passes to the All Numbers Received decision 1060. If all locations have not completed sending entries, the No path is followed, the central processor again issues a request and the loop continues until all remote locations have sent their number combination entries. It will be obvious that this loop has built-in checks to ensure that the receipt of entries occurs in a timely fashion. Since these checks are common to all lotto gaming methods they are not discussed in detail. When all the number combination entries have been received from the remote locations the Yes path is followed out of the All Numbers Received decision 1060 and process flow proceeds to the Initialize Data Base Counters & Pointers step 1100 in FIG. 2B via off page connector A 1065.

Figure 2B:
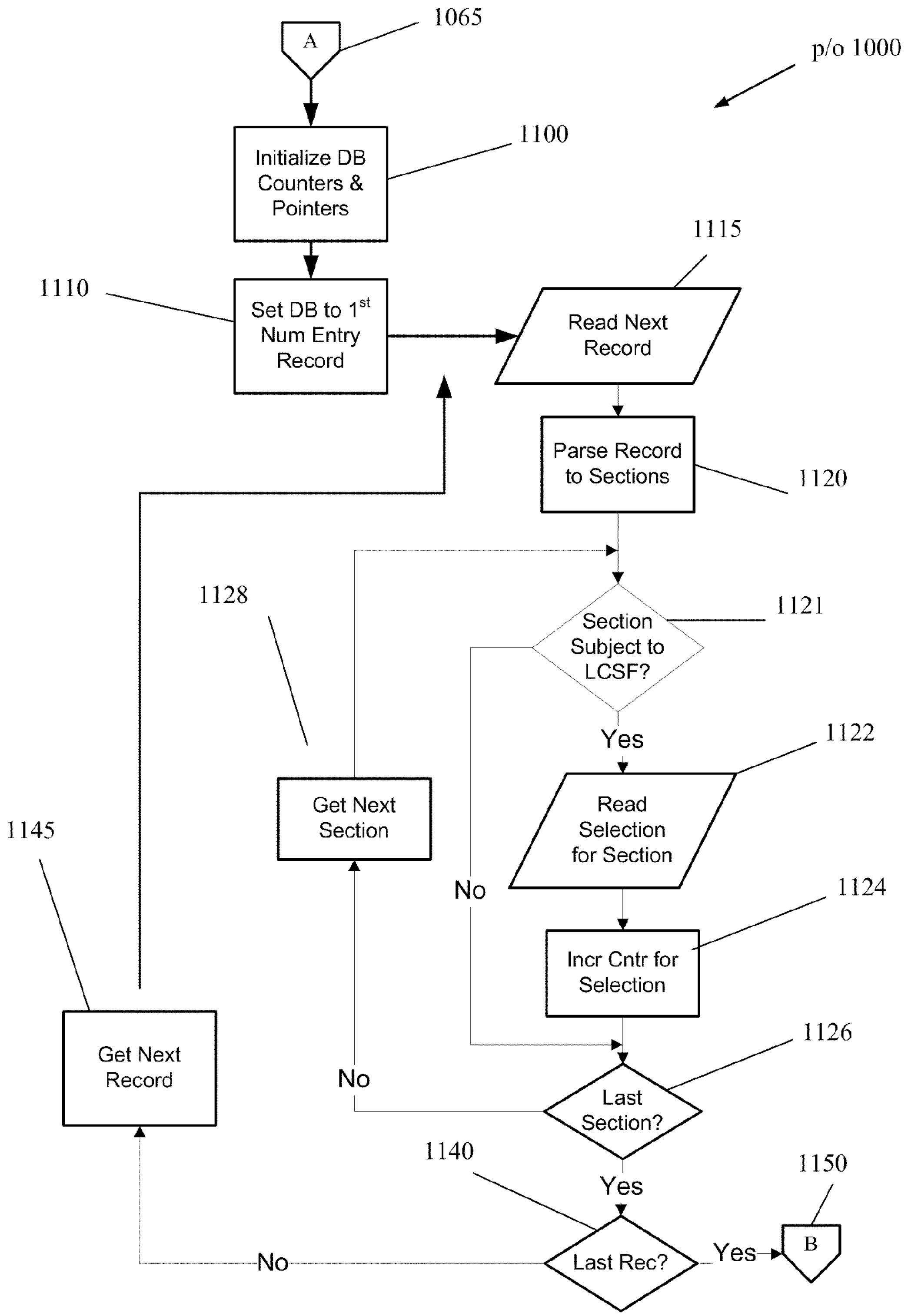

Referring to FIG. 2B, the process enters the Initialize Data Base Counters & Pointers step 1100 via off page connector 1065. The Initialize Data Base Counters & Pointers step 1100 is used to reset all internal registers and memories to a known state in preparation for executing the Least Chosen Selection Function [LCSF] (520 of FIG. 1.), and possibly the Random Number Function (522 of FIG. 1.), or some combination of these functions. The LCSF process is then started at Set Data Base to 1$^{st}$ Entry Record step 1110. This is done to ensure that the process begins with the first possible number combination entry. Note that the exact method used to denote the first possible number combination entry is not an important detail, but by way of explanation, in a preferred embodiment is based on a 'time of entry' stamp from the remote locations. Thus the player who made his/her selections at the earliest time in the current game cycle has that entry denominated as the first possible number combination entry.

At Read Next Record step 1115 the current record in the data base is read into a temporary register for analysis. The record is parsed into sections at Parse Record to Section step 1120. At the Section Subject to LCSF decision 1121, it is checked whether the current section is subject to the LCSF winning number generation method. If yes, the control flows to Read Selection for Section 1122, where the number—or the selection—that the player entered into that section is read. If the answer in 1121 was No, then the process skips to the Last Section decision 1126. Going back now to the Yes path, at Increment Counter for Selection step 1124 the counter for the specific selection entered is incremented, which includes the current record or entry into the total count for this particular selection. The method of the present invention creates a series of counters—one for each possible selection in the section—to record the number of times each of the possible selections has been picked. In this way, once all records have been analyzed, the cumulative section counter data will necessarily contain the number of times each of the possible selections for each of the sections subjected to LCSF has been selected by all players for that game cycle.

At Last Section decision 1126 the method of the present invention determines if the last section for the current record has been processed. If not, the No path is followed out of Last Section decision 1126 to the Get Next Section step 1128. The process then loops through all sections in the current record, incrementing the appropriate counters until all sections have been read. Once all sections of the current record have been analyzed the Yes path is followed out of Last Section decision 1126 leading to the Last Record decision 1140. Here the method of the present invention determines if all records in the data base have been analyzed. Assuming for the moment that not all records have been analyzed, the No path is followed out of Last Record decision 1140 to the Get Next Record step 1145. From here the loop described just above is again executed.

Assume now that the last record in the data base has been analyzed. The Yes path is followed out of Last Record decision 1140 causing the process to pass to the Get 1$^{st}$ Section step 1200 in FIG. 2C via off page connector 1150.

Figure 2C:
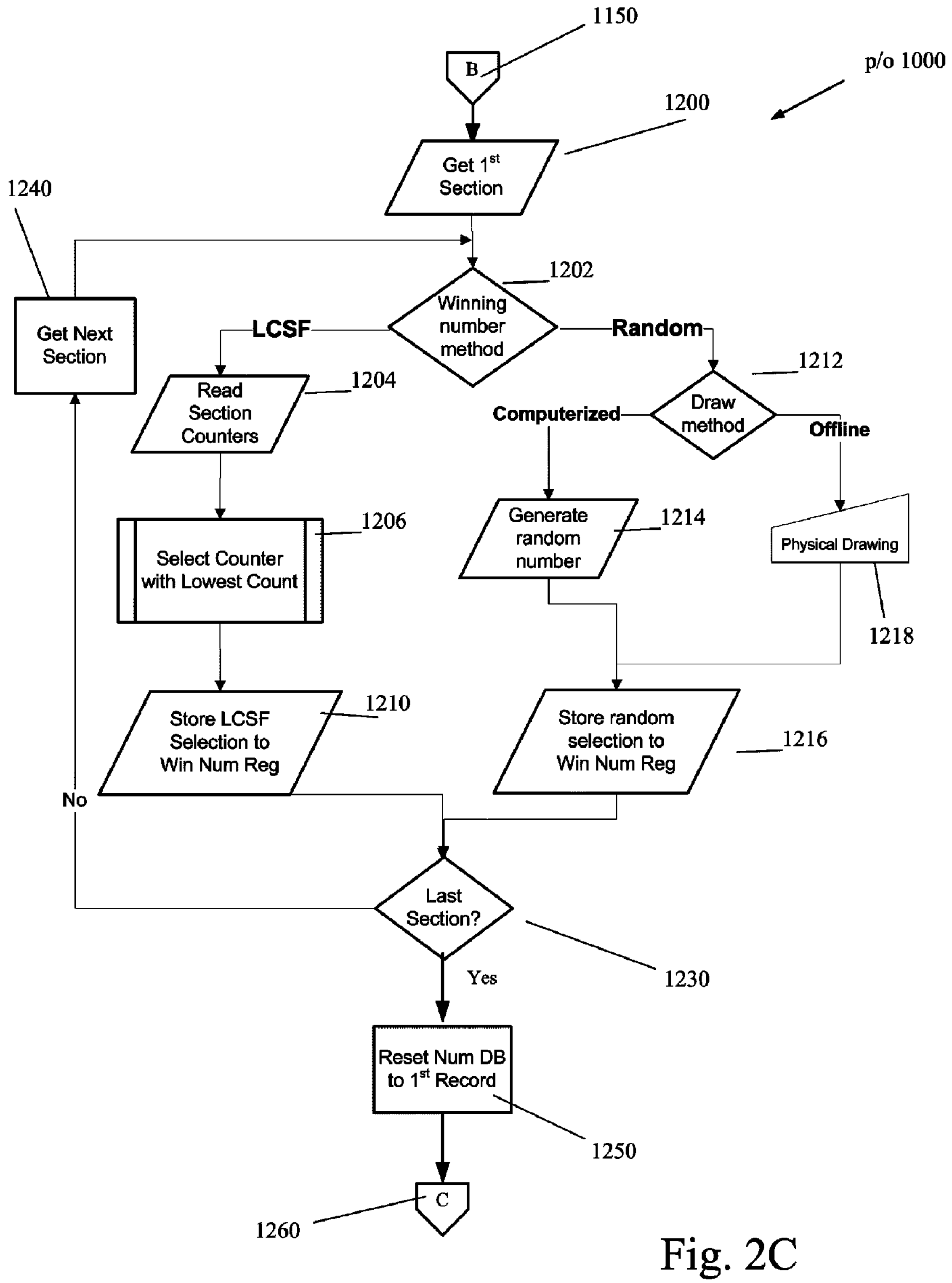

Looking at FIG. 2C, the Get 1$^{st}$ Section step 1200 has been entered via off page connector 1150.

At Winning Number Method step 1202, the method of the invention checks whether this section is subject to the LCSF or random drawing winning number generation methods. If it is the former, then control flows to the Read Section Counters step 1204. Recall that at this point in the process the section counters contain the number of occurrences for each of the possible selections for each of the sections that are subjected to the LCSF winning number generation method. So, for example, if a number combination entry has one section subjected to LCSF, and this section has two thousand possible selections, there will exist a total of two thousand counters that have each been incremented to contain the total number of times each of the two thousand selections in section one was selected by all the players in that game cycle. Thus the purpose of the Get Section Counter step 1204 is to read the counters for the current section into a temporary memory location.

At Select Counter with Lowest Count step 1206, the one counter for the current section that has been incremented the least is selected. At Store LCSF Selection to Winning Number Register step 1210 the number, or the combination of numbers, that is represented by the counter that had the lowest increment count is stored to the winning number register. At Last Section decision 1230 the method of the present invention checks to see if all the sections has been processed. If not, the No path is followed passing process control to the Get Next Section step 1240. The loop described just above is repeated until all sections have been processed. Once this is done the Yes path is followed out of Last Section decision 1230 entering the Reset Num Data Base to 1$^{st}$ Record step 1250. This step is used to reset the data base pointer to the first record in preparation for determining if any players correctly guessed the winning number. From here process control passed to FIG. 2D via off page connector 1260. Note that this last step (1250) may or may not be necessary depending on the database implementation.

If the Winning Number Method decision 1202 instead was Random, this means that the section is subjected to a traditional random drawing process. In the Draw Method decision 1212, the method checks whether the random drawing is to occur within the central processor or if it is a physical offline process. If it is the former, then the next step is Generate Random Number 1214. The preferred method here is to use a random number function that can return integer values in the range between 1 and the number of possible selections in the section. Each possible return value is then associated with one of the selections in the section. After this mapping has been performed, the result is stored to the database in the Store Random Selection to the Winning Number Registry step 1216. At next the process flows to the aforementioned Last Section decision 1230.

If the Draw Method decision 1212 instead was offline, a physical drawing will take place. This means a traditional drawing process such as pulling numbers out of a basket is being employed. Note that this processing step, which occurs outside of the central processor, may take place asynchronously to the remaining chart. It could happen prior to or after the other steps in FIG. 2C, but both processes must be completed before step 1300 in FIG. 2D. The winning number from the physical drawing is input back into the central processor—whether synchronous or asynchronously—in step 1216.

Figure 2D:
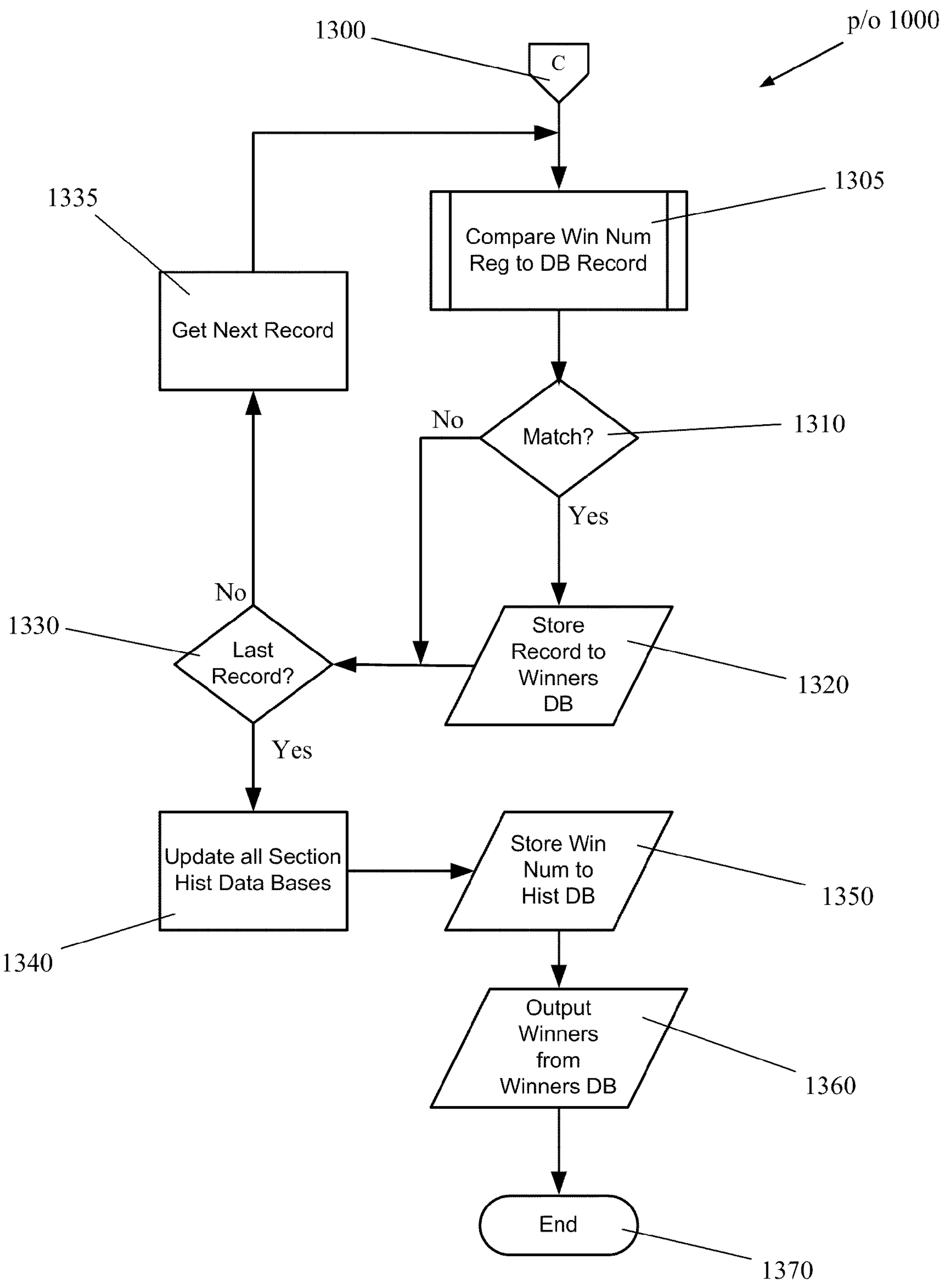

Turning now to FIG. 2D, the process enters the Compare Winning Number Register to Data Base Record step 1305 via off page connector 1300. At this point in the process the winning number, that is, the number entry combination comprised of the winning selections from all sections is contained in the Winning Number Register. The Compare Winning Number Register to Data Base Record step 1305 is used to determine if any of the players in the current game actually guessed the winning number. Recall that the data base pointer had been reset to the first record. If the number entry combination for that record did does not match the winning number, the No path is followed out of Match decision 1310 to the Last Record decision 1330. If the current record is not the last record in the data base the process enters the Get Next Record step 1335. The data base record pointer is incremented and the next record in the data base is checked.

Consider now the case where a player has guessed the winning number. The Yes path is followed out of Match decision 1310 where the record number of the winning number is stored to the Winners data base at Store Record to Winners Data Base step 1320. From here the process enters the Last Record decision 1330 and the process proceeds as discussed above.

Once all records have been examined for winning number entries the Yes path is followed out of Last Record decision 1330. At Update all Section History Data Bases step 1340 the counters for all selections in the sections subjected to LCSF are stored to the historical section data base. The historical section data base contains a record of the number of times each of the possible numbers for each of the sections has been selected over all games. These data are published along with the winning number combination providing the players with a historical view of which numbers have been selected least over time. With this information it is possible for players to devise new or alternative strategies for picking their next entry.

At Store Winning Number to History Data Base step 1350 the winning number for the current game is added to the winning numbers from all previous games forming a record that players my use when thinking about future number combination entry selections. The winning number combination is then published at Output Winners from Winners Data Base step 1360 and the process ends at End step 1370. As with other common steps described above, the exact details of how the winning number is published to the players does not directly impinge on the method of the present invention thus is not discussed in detail. It will be clear that numerous methods for winning number publication could be used without departing from the spirit of the invention, thus the lack of a detailed discussion should not be read as a limitation on the scope of the invention.

Figure 3:
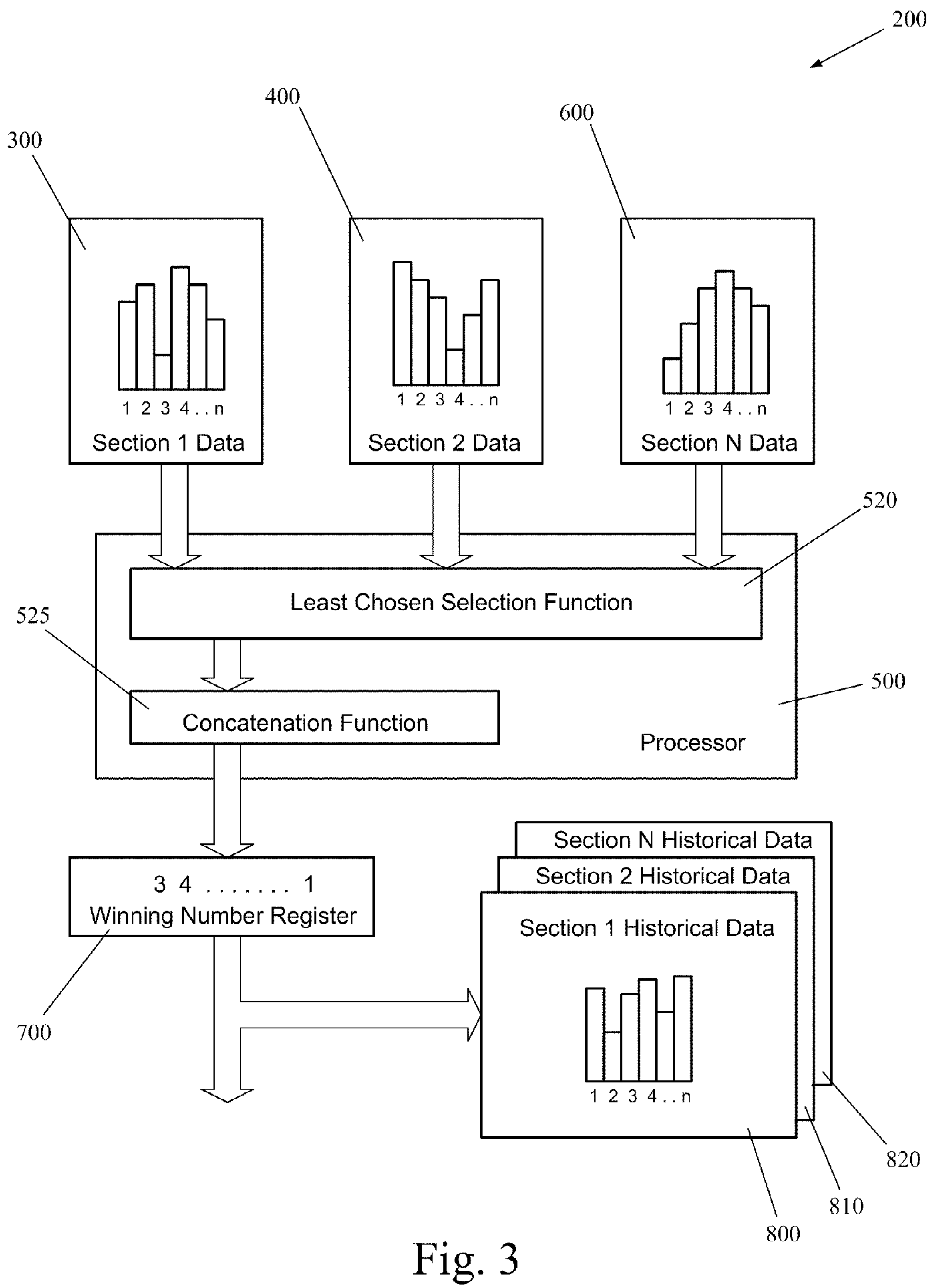
FIG. 3: is a graphical representation of the method of the present invention particularly describing the transformation from number combination entries to a winning number combination.

FIG. 3 presents a graphical discussion 200 of the method of the present invention. At this point in the process the time for the current game has run, thus the game is closed, all number combination entries have been submitted to the central processor and the central processor has parsed the entries and populated the section data base for the current game. As can be seen there were n possible numbers for any given player to choose from represented by the numbers 1, 2, 3, 4, through n. As can also be seen there were N sections in the template completed by all players represented by Section 1 Data 300, Section 2 Data 400 and Section N data 600. Note that for this example each of the plurality of sections could be assigned any of the numbers 1 through n, however, as described above, it is possible to assign each section a number type. In either case the method of the present invention operates the same, thus the presence or absence of a specific set or type of number entry in any given section should not be read as a limitation on the scope of the invention. Furthermore, the example in FIG. 3 shows only sections subjected to the LCSF, thus not displaying the sections subjected to random drawing.

Taking a closer look at Section 1 Data 300 it can be seen that of all numbers submitted by all players for the current game in section 1, the number 3 was selected least. The LCSF 520 within Processor 500 analyzes all these data for section 1, passing the result to the Concatenation Function 525 and thence to the Winning Number Register 700. At this point in the process the first digit(s) of the winning number is known.

As was discussed above in detail in conjunction with FIG. 2, the process steps through each of the plurality of section to ascertain the least chosen selection, which in this case is also the least selected number, for each of the totality of section data contained in the section counters. Thus once the section 2 data have been analyzed by LCSF 520, the least selected number is written to the Winning Number Register 700 by the Concatenation Function 525. Once all section data have been similarly analyzed the Winning Number Register 700 contains the winning number combination for the current game. For this particular game the winning number combination is 3, 4, . . . 1.

Two actions are taken once the winning number combination has been determined. First, the central processor updates the section history data bases for each of the plurality of sections for use by players in future games as discussed below. Second, the winning number combination is published to the players so that any prizes due may be identified.

Figure 4A:
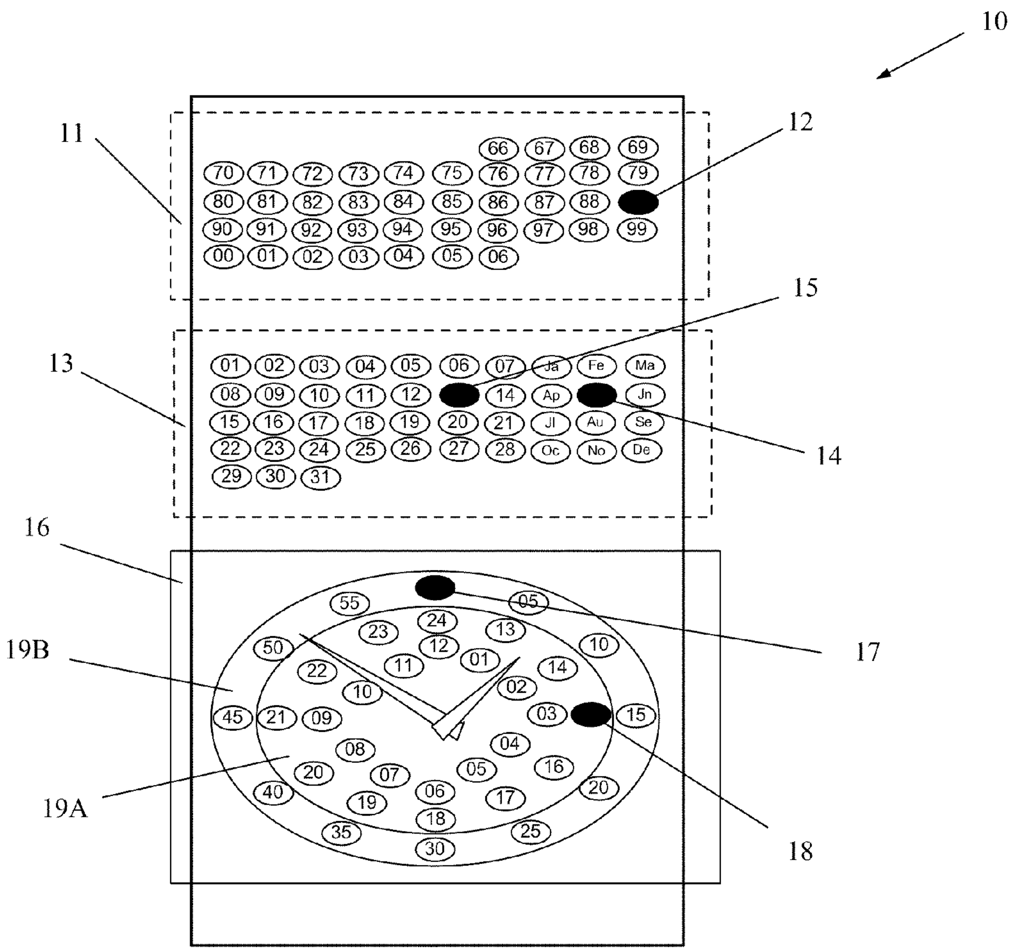
FIGS. 4A and 4B: is a sample player ticket showing how the input record is formed for use as a template by the unique algorithm.

Turning now to FIG. 4, a sample of a player ticket 10 is shown. In this example, the data are of the calendric type, including year, month day, hour and minute, however it will be recognized that other types of data may be used without departing from the spirit of the invention. In FIG. 4A selected year 12 is 89, the month 14 is May, the day 15 is the 13th, the hour 18 is 1300, or 3:00 PM, and the minute 17 is 00. The year data 11 are presented in row and column format as are the month and day data 13. The time data 19A and 19B are presented in clock format to assist the player in visualizing their selection.

In this example, the preferred embodiment has the template divided into three sections. The first section consist of the Year, Month, and Day fields. Thus the possible selections for this section is comprised of any combination of the selectable Year, Month and Day fields. Note that with this template it is possible to select non-existing dates such as Feb. 31, 1975.

Another template for the same game would have an actual calendar that only allows actual dates to be selected. A computerized user interface, much like a travel reservation application, would easily enable this. In either way, this first section would be subjected to the LCSF winning number generation. This means simply stated that the least picked date in the current game cycle will be the winning date.

In addition to the Year/Month/Day section, this template has two additional sections. Hour, which has 24 possible selections, is a section which is subjected to the random winning number generation. Minute, which here is selectable only in five-minute increments is another section subjected to the random winning number generation method. Note that in this embodiment, the lotto operator can vary the total number of selections by choosing the minute increment, and also by how many years to include. This is useful since total number of selections, or matrix size as this is called in the lottery industry, is adapted to match the player population to obtain certain desirable odds for jackpot rollover.

Figure 4B:
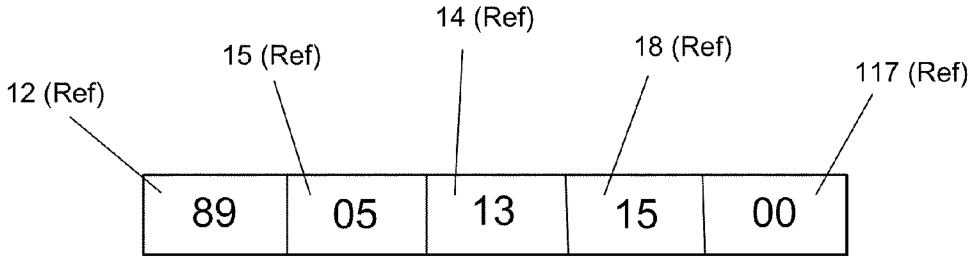

FIG. 4B describes how the player data are formed into a record to be submitted to the central processing computer, called a number combination entry. The numbers are concatenated to form a complete record, with the month data being made numerical—e.g. May is month 05. The data are delimited in the customary way, so is not discussed in detail.

Figure 5:
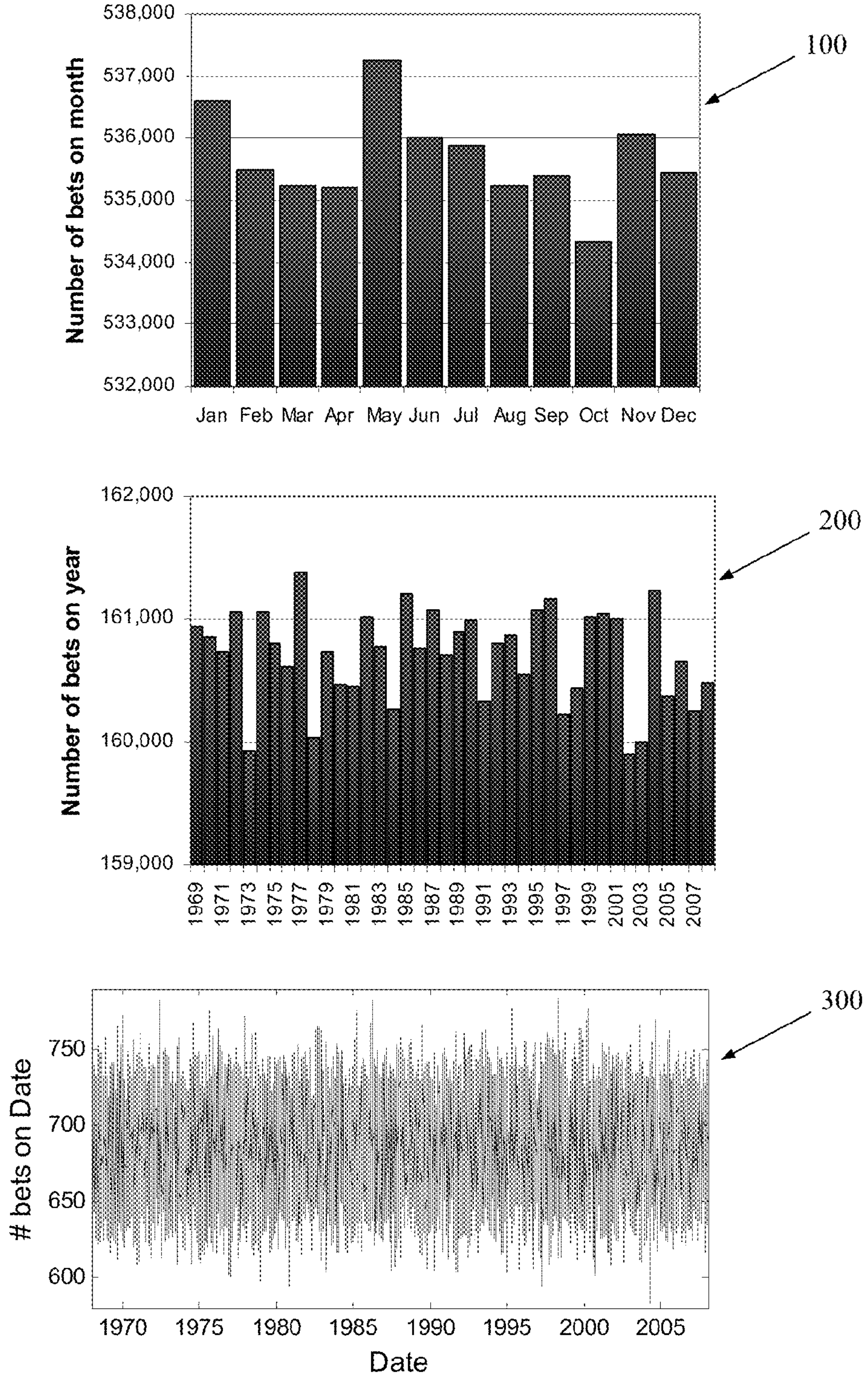
FIG. 5: is sample data visualization to show the count statistics for different sections and parts of sections.

Looking at FIG. 5 an example of how statistics from previous games can be published to the plurality of players. A histogram 100 shows the counts received for each Month selection, and another histogram 200 shows the count statistics for the Year selection. Note however that the LCSN operates on the combination of Year, Month and Day in this preferred embodiment, but this joint count distribution would be very large to show. An example of these count numbers, that is for Year/Month/Day combination is shown 300.

As mentioned above there are multiple challenges when constructing a lotto game. For one it must not be possible for big players to manipulate the game outcome in such a way that they can improve their own odds at the expense of the other players. The LCSF principle opens up the possibility for such manipulations since the winning number combination is a function of the combined actions of the plurality of players. As long as only one section is subject to LCSF, the cost of manipulating the game far exceeds the expected winnings.

For simplicity consider a $1 game with two sections, section 1 subject to LCSF with 1000 possible selections, and section 2 subject to random drawing with 2000 possible selections. The odds for getting only section 1 correct would be 1/1000 if the winning number is random and slightly harder with LCSF, so we can conservatively assume 1/1000. The prize to get only section 1 correct would be typically be 10% of the expected return (typically 50% of the pot is allocated to the prizes, and the largest portion of this goes to the top prize), that is the prize would be around $100. A player can only influence the outcome of section 1. To do this he must place a large number of bets on all but one selection in section 1, then a smaller amount of bets on the designated one selection. Placing 5 bets on each of the 999 selections not intended to win would cost $4,995, whereas the one bet placed on the designated selection only would yield $100 in prize money. And consider now the odds of winning the top prize or jackpot with this one bet. The odds of this is 1/2000 since there are 2000 possible selections in section 2. Thus the player has spent $4,995−$100=$4,885 for an improved odds to win the jackpot. The jackpot prize for this game would typically be 25% of the pot, roughly speaking this would amount to $500,000 for a game with 2,000,000 possible selections. Only once in 2000 times will this player hit the jackpot, which means he will spend 2000×$4,885=$10 mill to win $500,000. Thus, the manipulator only worsened his likely winnings.

Figure 6:
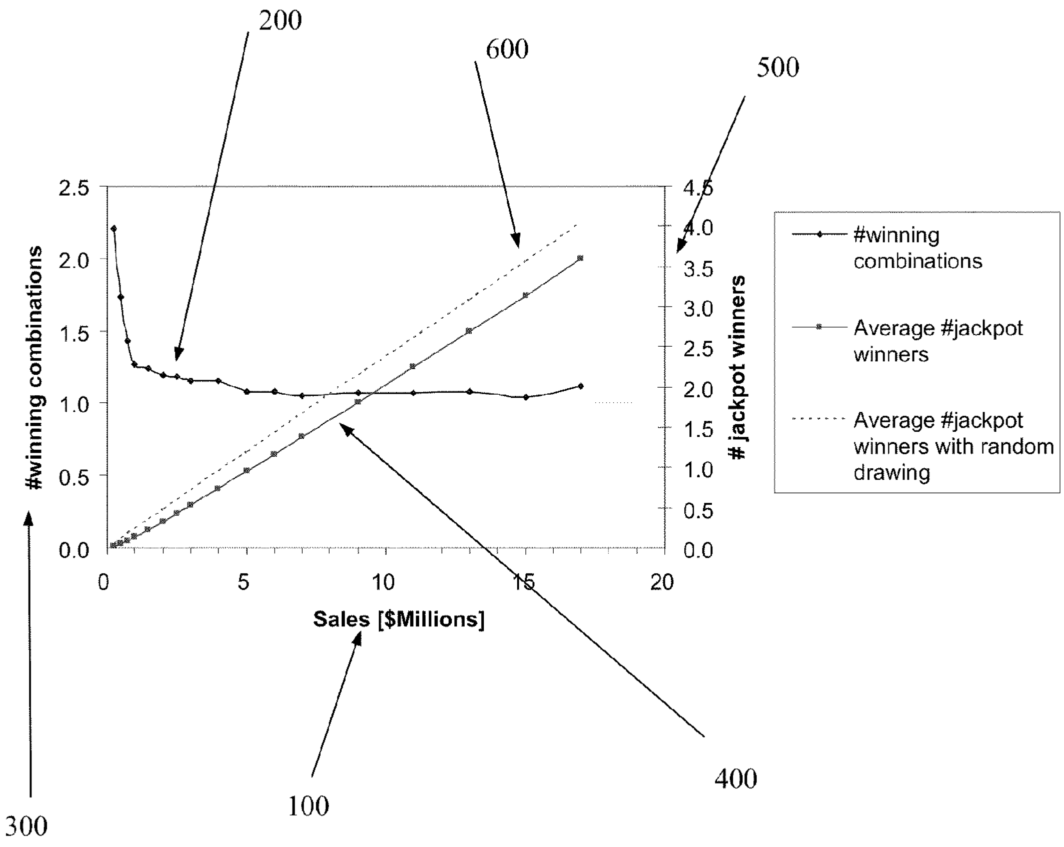
FIG. 6: is a graphics representation that shows results from a Monte Carlo simulations of number of winning selections with LCSF and the number of jackpot winners as a function of ticket sales.

Another consideration when designing the template for the present invention is the likelihood of someone winning the jackpot and the likelihood that more than one selection will be the least selected. These are both functions of the number of possible selections in the LCSF section and the random sections and the number of bets per game. Using simple statistical simulation (Monte Carlo simulations), one can investigate these characteristics. For the example in FIG. 6 there is one LCSF section with a Year/Month/Day matrix with a total of possible, 14,600 selections (40 years, and 365 day/month combinations). There are two random sections, Hour and Minute, where minutes are in five-minute increments, so that there are 288 possible time selections. In all then there are 4.2 million number combinations in this game. The graph in FIG. 6 shows on the x-axis 100 the total sales in the current game cycle, where one bet is $1. One can see that the number of winning selections 200, the value which can be read on the left y-axis 300, is close to 1 as long as the total sales are larger $4 million. For very low sales there is an increased likelihood that two dates will share the lowest number of counts. When this happens, the lotto company can decide whether to have multiple winning combinations or to decide between the two (or more) winning combinations by a random process or by a predetermined rule. From the same graph, reading now from the second y-axis 500, one can see the expected number of jackpot winners 400. For comparison the graph also shows the expected number of jackpot winners 600 if both sections were subjected to a random winning number generation method. Usually the lotto companies want the expected number of jackpot winners to be around 1; this ensures large prizes, and occasional jackpot rollovers.

One unique and useful feature of the present invention is the ability of the players to use the historical section data as part of a selection criteria strategy in future games. Since these data are known and published, a player can routinely consult the historical data to understand which of the possible selections for any given section have been historically over or under represented. As well as making the game more interesting for players, it provides a tool for use by the players in approaching future number choices.

Another novel feature of the present invention is the ability for a player to play more than one selection per section. For example, suppose a player had consulted the historical data and decided that over time the numbers 3 and 17 were the least selected in section five. By paying a double fee at the time of purchase of the template, the player could place both numbers in section five increasing the chance of producing a winning number.

A first advantage of the present invention is that it provides an increased level of interest for the players. Because the players have the ability to review historical data the have an additional tool to use in setting a number selection strategy. This increased interest could be manifested as increased participation, thus the sponsors, the players and the recipients of lotto revenues all benefit.

A second advantage of the present invention is that it allows players an easy and elegant way to play their favorite numbers. Through the use of a template and a number type, a player is less likely to be confused when making number selections. Further the use of a calendar number type makes the selected number combination easier to remember. Alternatively, historical dates or other superstitiously predicated numbers can just as easily be played.

A third advantage of the present invention is that the use of number types, for example, calendric numbers, may also be used by existing lotto games. Thus if a lotto game provider wished to increase player participation, one way to do so would be to offer the calendric number type instead of plain and arbitrary digits.

A fourth advantage of the present invention is that existing lotto gaming systems can be programmed to use the least chosen selection function. By doing this an existing lotto game provider could widen the player population increasing the benefits to all parties involved.

What is claimed is:

1. A method for operating a gaming device configured to generate the winning combination of numbers in a lottery game, comprising:

storing a plurality of number combination entries by a plurality of players at a plurality of locations, said method further comprising:

causing at least one display device to present said plurality of players with a template comprised of a plurality of sections, each said section containing a distinct set of possible selections, said plurality of players picking one selection in each section, such that each of said templates becomes an instance of a number combination entry;

causing at least one controller to send said plurality of said number combination entries from said plurality of locations to a central processor;

receiving said plurality of number combination entries from said plurality of locations at said central processor;

operating upon said received plurality of said number combination entries within said central processor to determine a winning number combination, said determination comprising:

in at least one section the winning selection being the selection that was chosen the least by the plurality of players from among all possible selections for this section;

in the remaining sections the winning selection being generated by a traditional random drawing;

forming the winning number combination by concatenating said winning selections from each of said sections;

recording said winning number combination in historical data files; and outputting said winning number combination.

2. The method of claim 1 where the sections are made up of calendar elements such as Day, Month, Year, Hour and Minute and Second.

3. The method of claim 2 where the possible selections in a first section are Day, Month and Year combinations and this section is subjected to the least chosen selection winning number generation method, and the remaining sections Hour and Minute are subjected to random drawing for the winning number generation.

4. The method of claim 2 where the template allows for any combination of Day, Month, and Year to be selected including non-existing dates.

5. The method of claim 2 where the template only allows for real dates to be selected.

6. The method of claim 1 where the selections are integer numbers.

7. The method of claim 1 where the player may enter a plurality of selections in the same section.

8. The method of claim 1 where the plurality of number combination entries are stored in a historical database so that frequency statistics can be generated and provided to the plurality of players.

9. The method of claim 1 wherein the random winning number generation is performed within the central processor.

10. The method of claim 1 wherein the random winning number generation is performed by a physical process outside of the central processor.

11. A system for selecting the winning combination of numbers in a lottery game comprising:

one or more transaction units at remote locations, each of said transaction units allowing players to select number combination entries and then storing said selected number combination entries in the memory of said transaction units;

a modem connected to each of said one or more transaction units;

a central processor, said central processor operating upon templates received from said plurality of transaction units in a way that determines a winning number selection by selecting from at least one of a plurality of sections within each of said templates the selection that occurs least among all possible selections populating said section within said templates;

said central processor configured to form a winning number combination by concatenating the winning number selection with a number combination generated by a traditional random drawing; and a network formed by each of said transaction units, said modems, an interconnection medium and said central processor such that each of said transaction units can communicate with said central processor upon request.

12. The system of claim 11 wherein each of the transaction units is a point-of-sale terminal.

13. The system of claim 11 wherein each of the transaction units is a personal computer.

14. The system of claim 11 wherein the transaction units are comprised of a mix of point-of-sale terminals and personal computers.

15. The system of claim 11 wherein the network is the Internet.

16. The system of claim 11 wherein the interconnection medium is a local area network.

17. The system of claim 11 wherein the interconnection medium is wireless.

18. The system of claim 11 wherein the interconnection medium is wired.

* * * * *